(12) United States Patent
Sato et al.

(10) Patent No.: US 7,121,580 B2
(45) Date of Patent: Oct. 17, 2006

(54) SIDE AIRBAG APPARATUS

(75) Inventors: Eiji Sato, Aichi-ken (JP); Satoshi Mabuchi, Aichi-ken (JP)

(73) Assignee: Toyoda Gosei Co., Ltd., Aichi-ken (JP)

(*) Notice: Subject to any disclaimer, the term of this patent is extended or adjusted under 35 U.S.C. 154(b) by 43 days.

(21) Appl. No.: 11/005,303

(22) Filed: Dec. 7, 2004

(65) Prior Publication Data

US 2005/0121888 A1 Jun. 9, 2005

(30) Foreign Application Priority Data

Dec. 8, 2003 (JP) ............... 2003-409144

(51) Int. Cl.
*B60R 21/16* (2006.01)
(52) U.S. Cl. ................. 280/730.2; 280/743.1
(58) Field of Classification Search ............ 280/730.2, 280/730.1, 743.1
See application file for complete search history.

(56) References Cited

U.S. PATENT DOCUMENTS 5,722,685 A * 3/1998 Eyrainer ................ 280/730.2
6,705,639 B1 * 3/2004 Masuda ................. 280/730.2

FOREIGN PATENT DOCUMENTS

| JP | A-2000-289558 | 10/2000 |
|---|---|---|
| JP | A-2003-261000 | 9/2003 |

* cited by examiner

Primary Examiner—Faye M. Fleming
(74) Attorney, Agent, or Firm—Posz Law Group, PLC

(57) ABSTRACT

A side airbag apparatus for a vehicle is provided. The apparatus has an airbag and a gas generator. The gas generator supplies gas to the airbag such that the airbag is deployed and inflated at a side of an occupant. The airbag has a loop seam, which is formed by sewing parts of the airbag that face each other in a lateral direction of the vehicle such that no clearance is created at the loop seam. A slit formation portion is provided in part of the airbag that is encircled by the loop seam. When the airbag is deployed and inflated, the slit formation portion opens as a slit.

15 Claims, 4 Drawing Sheets

SIDE AIRBAG APPARATUS

BACKGROUND OF THE INVENTION

The present invention relates to an airbag apparatus having an airbag that is deployed and inflated at a side of an occupant of a vehicle when an impact of a force greater than a predetermined value is applied to a side of the vehicle body due to a side collision.

Typically, when an impact the magnitude of which is equal to or greater than a predetermined value is applied to a side of a vehicle, an inflator, which is incorporated in an airbag, generates and injects gas into the airbag, thereby deploying and inflating the airbag. The deployed and inflated airbag is pressed against a shoulder and the lumbar region of an occupant, thereby protecting the occupant from the side impact. Accordingly, configurations for optimizing the thickness of airbags to protect vehicle occupants when airbags are deployed and inflated have been disclosed (for example, refer to Japanese Laid-Open Patent Publications No. 2003-261000 and No. 2000-289558).

Japanese Laid-Open Patent Publication No. 2003-261000 discloses a method for optimizing the thickness of a side airbag in a deployed and inflated state by means of a seam that is formed by sewing fabric sheets of the airbag to each other. On the other hand, Japanese Laid-Open Patent Publication No. 2000-289558 discloses a method for optimizing the thickness of a side airbag in a deployed and inflated state by coupling fabric sheets of the airbag with a substantially belt-like tether, which functions as a thickness limiting member.

However, according to the publication No. 2003-261000, since the fabric sheets are directly sewn to each other, it is impossible to create a sufficient distance between the fabric sheets. Thus, it is difficult to optimize the thickness of the airbag to protect an occupant. On the other hand, although the method according the publication No. 2000-289558 is capable of widening the distance between the fabric sheets with the tether, the tether needs to be prepared as a separate member from the fabric sheets and needs to be sewn to the fabric sheets in the manufacturing process of the side airbag. This increases the number of components and the manufacturing steps. As a result, the manufacturing cost is increased.

SUMMARY OF THE INVENTION

Accordingly, it is an objective of the present invention to provide a side airbag apparatus that is manufactured at a reduced cost and has an improved capacity for protecting occupants.

To achieve the foregoing and other objectives of the present invention, a side airbag apparatus for a vehicle is provided. The apparatus has an airbag and a gas generator. The gas generator supplies gas to the airbag such that the airbag is deployed and inflated at a side of an occupant. The airbag has a loop seam. The loop seam is formed by sewing parts of the airbag that face each other in a lateral direction of the vehicle such that no clearance is created at the loop seam. A slit formation portion is provided in part of the airbag that is encircled by the loop seam. When the airbag is deployed and inflated, the slit formation portion opens as a slit.

The present invention provides another side airbag apparatus for a vehicle. The apparatus has an airbag and a gas generator. The gas generator supplies gas to the airbag such that the airbag is deployed and inflated at a side of an occupant. The airbag has a loop seam. The loop seam is formed by joining parts of the airbag that face each other in a lateral direction of the vehicle such that no clearance is created at the loop seam. A weakened portion is provided in part of the airbag that is encircled by the loop seam. The weakened portion is capable of being broken by tension generated by deployment and inflation of the airbag.

Further, the present invention provides an airbag that is deployed and inflated at a side of an occupant of a vehicle with gas supplied by a gas generator. The airbag has a loop seam. The loop seam being formed by sewing parts of the airbag that face each other in a lateral direction of the vehicle such that no clearance is created at the loop seam. A slit formation portion is provided in part of the airbag that is encircled by the loop seam. When the airbag is deployed and inflated, the slit formation portion opens as a slit.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment according to the present invention will now be described with reference to FIGS. 1 to 6.

Figure 1:
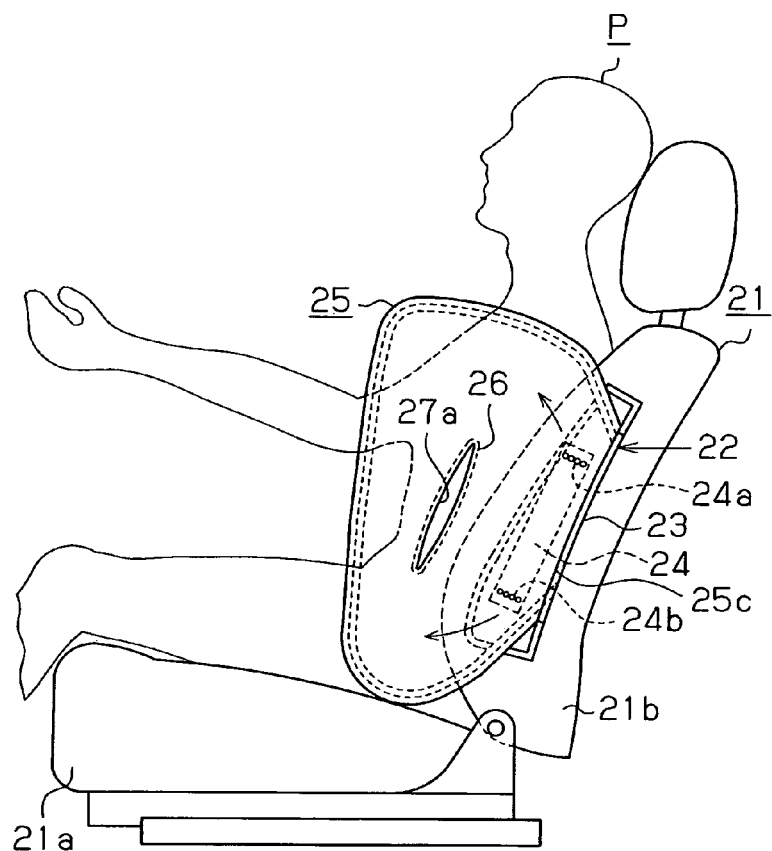
FIG. 1 is a side view illustrating part of a passenger compartment of a vehicle to which an airbag apparatus according to one embodiment of the present invention is applied.

FIG. 1 shows a left front seat 21 located in a passenger compartment. The front seat 21 includes a seat portion 21*a* and a backrest 21*b*. A side airbag apparatus 22 that is accommodated in a case 23 is incorporated in a side of the backrest 21*b* of the front seat 21. The side airbag apparatus 22 corresponds to a door (not shown), which forms part of a body side portion of the vehicle. Although only the left front seat 21 is illustrated in the drawings, a right front seat incorporates a similar airbag apparatus.

The side airbag apparatus 22 includes a gas generator, which is an inflator 24, and an airbag 25. The airbag 25 covers the inflator 24. The inflator 24 incorporates gas generating agent (not shown) that generates gas to deploy and inflate the airbag 25. Upper gas ports 24*a* and lower gas ports 24*b* are provided at the upper and lower portions of the inflator 24, respectively. Gas generated by gas generating agent is injected through the gas ports 24*a*, 24*b*. The inflator 24 is electrically connected to a sensor (not shown) that detects impact applied to the body side portion. FIG. 1 illustrates the airbag 25 when it is deployed and inflated by gas.

The airbag 25 is deployed and inflated to correspond to a shoulder and the lumbar region of an occupant P seated on the front seat 21. The airbag 25 generally is extended along an up-and-down direction. When an impact of which the magnitude is not less than a predetermined value is applied to a side portion of the vehicle, the inflator 24 supplies gas to the airbag 25. Then, from the folded state in the case 23, the airbag 25 is deployed and inflated in a space between the side door and the occupant P (see FIG. 1).

Figure 2:
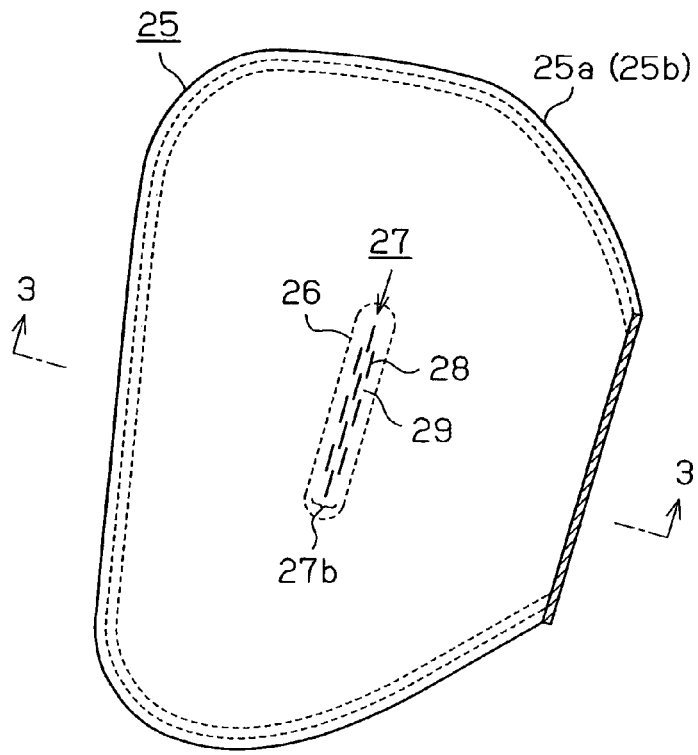
FIG. 2 is a plan view illustrating the airbag of FIG. 1.

As shown in FIG. 2, the airbag 25 has an outside fabric sheet 25a and an inside fabric sheet 25b made of woven cloth. The fabric sheets 25a, 25b are sewn together at the periphery to form the airbag 25. At the side of the inflator 24 of the airbag 25, or at the rear end, a non-sewn portion 25c where the fabric sheets 25a, 25b are not sewn is provided. Wiring harnesses connected to the inflator 24 are drawn out through the non-sewn portion 25c. The non-sewn portion 25c also functions as a vent hole for discharging gas that fills the airbag 25.

A substantially elliptical loop seam 26 is formed in a center portion of the airbag 25. The loop seam 26 extends along an up-and-down direction. In this description, the up-and-down direction includes any direction that is inclined by an angle less than 45° with respect to the vertical line. Preferably, the up-and-down direction includes any direction that is inclined by an angle less than 30° with respect to the vertical line.

The annular loop seam 26 is formed by partly sewing the fabric sheets 25a, 25b without a space in between, so that air (gas) does not pass through the loop seam 26. The loop seam 26 is located in a central portion of the airbag 25. That is, the loop seam 26 is located at an intermediate height in the airbag 25 to correspond to a region from the thorax to the abdomen of an occupant P seated on the front seat 21. In other words, the loop seam 26 is located to correspond to an upper arm of the occupant P (an adult) seated on the front seat 21. Therefore, the longitudinal size of the loop seam 26 corresponds to the range including the thorax and the abdomen of the occupant P. The loop seam 26 appropriately limits the thickness of the entire airbag 25 at the completion of deployment and inflation of the airbag 25.

FIG. 2 illustrates the airbag 25 in a state where the airbag 25 is not filled with gas and the fabric sheets 25a, 25b are simple spread. A slit 27a shown in FIG. 1 is formed when a slit formation portion 27 shown in FIG. 2 is broken until deployment and inflation of the airbag 25 are completed. In this description, the phrase "when the airbag 25 is deployed and inflated" refers to a state where the airbag 25 is inflated to its maximum size with supplied gas.

As shown in FIG. 2, the slit formation portion 27, which functions as a weakened portion, includes three perforations 27b extending along the up-and-down direction of the airbag 25. The perforations 27b are parallel to each other and spaced at a predetermined interval along the fore-and-aft direction of the airbag 25. The predetermined interval is determined such that portions of the fabric sheets 25a, 25b between each adjacent pair of the perforations 27b are broken when the airbag 25 is deployed and inflated. Each perforation 27b includes cut sections 28 formed by cutting the fabric sheets 25a, 25b along the up-and-down direction, and non-cut sections 29, each located between an adjacent pair of the cut sections 28. Each adjacent pair of the perforations 27b are in staggered arrangement such that the cut sections 28 and the non-cut sections 29 are arranged alternately. When the fabric sheets 25a, 25b are simply spread, the cut sections 28 in the outside fabric sheet 25a and the cut sections 28 in the inside fabric sheet 25b coincide. This allows the slit 27a to be smoothly formed.

When the airbag 25 is completely deployed and inflated as shown in FIG. 1, the slit 27a is opened in portions of the fabric sheets 25a, 25b encircled by the loop seam 26. In this embodiment, the slit 27a is formed along the up-and-down direction of the airbag 25 like the loop seam 26. Since the loop seam 26 airtightly connects the fabric sheets 25a, 25b, gas supplied to the airbag 25 does not leak to the outside from the slit formation portions 27 through the loop seam 26.

The operation of the side airbag apparatus 22 will now be described wither reference to FIGS. 1 to 6.

When another vehicle collides with the body side portion of the vehicle and the impact of the collision is equal to or greater than a predetermined values the impact sensor sends a detection signal to a control circuit (not shown). The control circuit, in turn, outputs a drive current to the inflator 24. The drive current generates heat, which causes the gas generating agent in the inflator 24 to generate gas. The gas is substantially simultaneously injected into the upper and lower portions of the airbag 25 through the upper and lower gas ports 24a, 24b of the inflator 24 as shown by arrows in FIG. 1. The airbag 25, with the gas supplied to its interior, is deployed and inflated from the folded state in the case 23.

Figure 3:
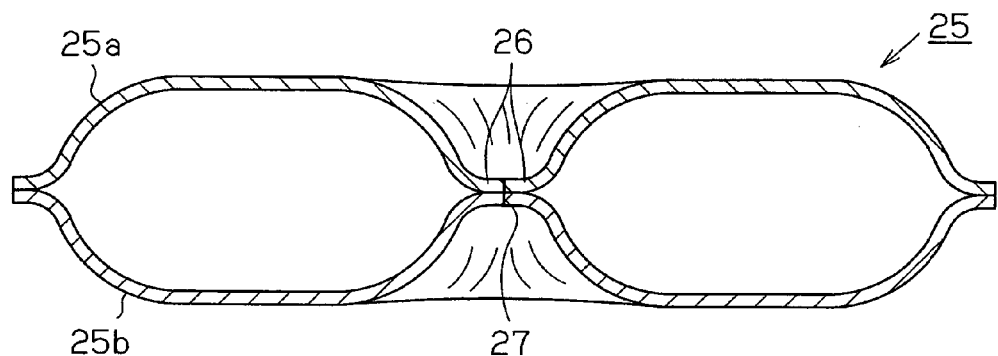
FIG. 3 is a cross-sectional view of the airbag before a slit formation portion is broken.
Figure 4:
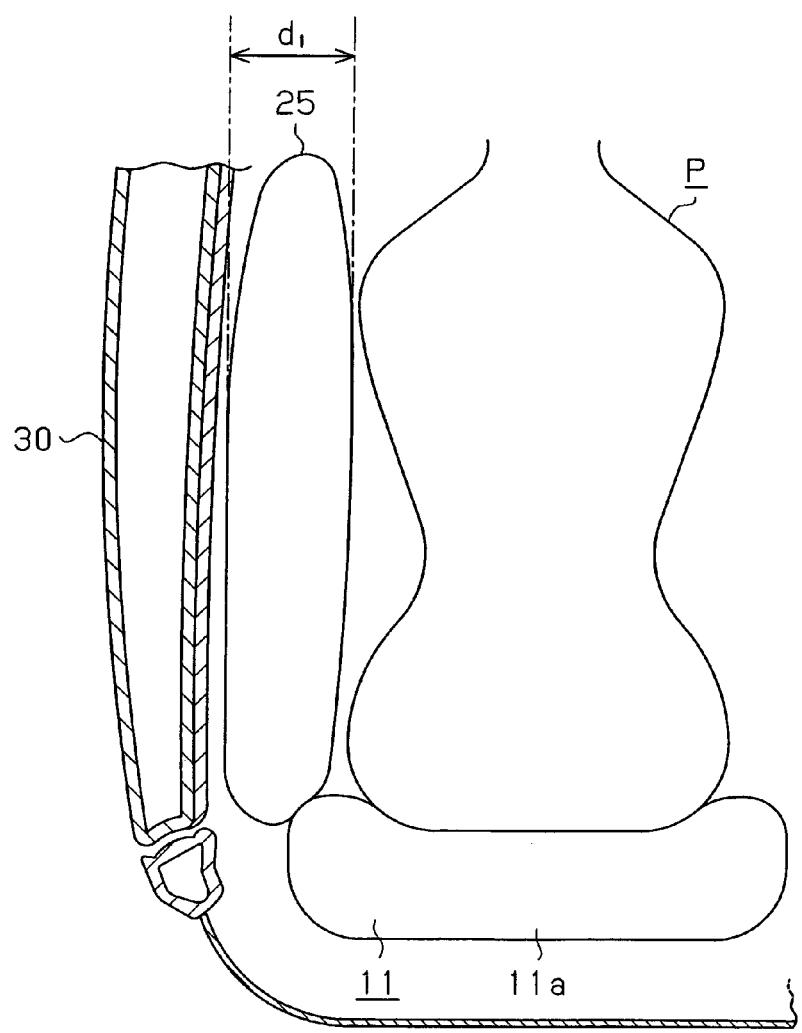
FIG. 4 is a rear view of the airbag when inflated and deployed, and before the slit formation portion is broken.

As shown in FIGS. 3 and 4, in an initial stage of deployment and inflation, the airbag 25 is inflated from the folded state into a space between the occupant P and a side door 30, which forms part of a body side portion of the vehicle, without the slit formation portion 27 being broken. At this time, the thickness of the airbag 25 is limited by the loop seam 26 sewing the fabric sheets 25a, 25b to each other. The airbag 25 is thus deployed and inflated in the space between the side door 30 and the occupant P in a plate-like shape with a thickness d1.

Subsequently, in an intermediate stage of deployment and inflation, gas supplied into the interior of the airbag 25 applies tension to the entire fabric sheets 25a, 25b. Then, in the central portion of the airbag 25, tension that acts in the fore-and-aft direction of the airbag 25 breaks the slit formation portion 27 shown in FIG. 2, thereby forming the slit 27a shown in FIG. 1.

Figure 5:
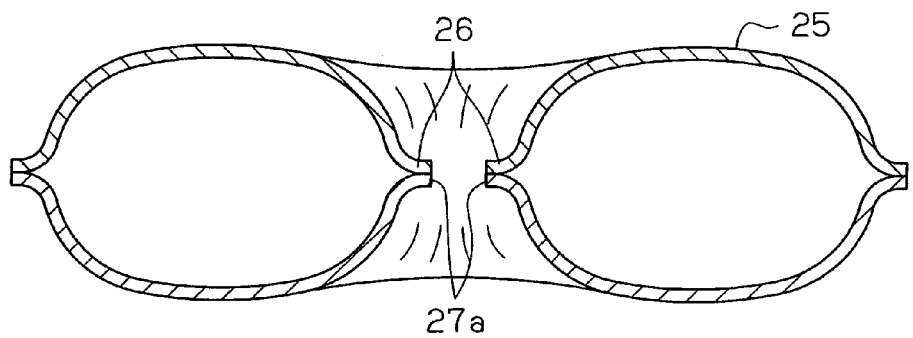
FIG. 5 is a cross-sectional view of the airbag after the slit formation portion is broken.
Figure 6:
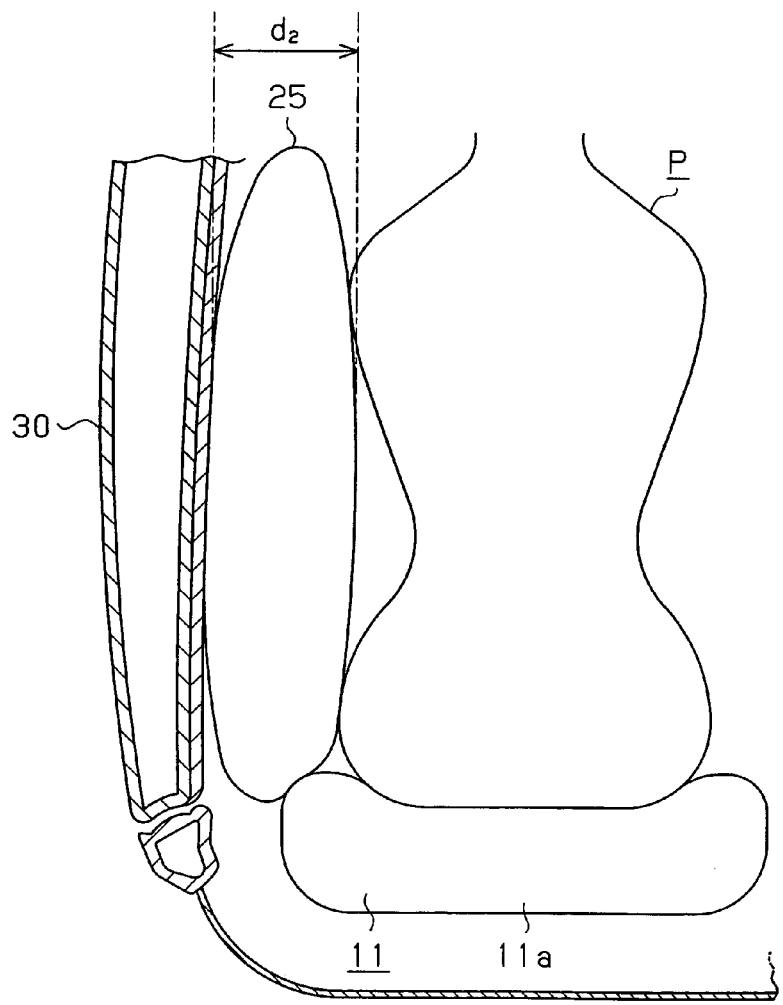
FIG. 6 is a rear view of the airbag when inflated and deployed, and after the slit formation portion is broken.

After being formed, the slit 27a is deformed so that its width increases as shown in FIGS. 1, 5, and 6. At this time, since the slit 27a is widened frontward and rearward, portions of the fabric sheets 25a, 25b frontward and rearward of the loop seam 26 each have a substantially circular cross-section as shown in FIG. 5. As a result, the airbag 25 is changed from a plate-like shape to a donut-like shape, while being further inflated. This increases the thickness of the entire airbag 25 to have a thickness d2 when the deployment and inflation are completed. In this manner, the side airbag 25 has the thickness d2, which is optimal for protecting the occupant P, in the space between the side door 30 and the occupant P when deployed and inflated. The optimum thickness of the airbag 25 refers to a thickness at which the airbag 25 does not push the occupant P by an excessive force, while holding the occupant P so that the occupant P is not displaced from the front seat 21.

In this state, the central portion of the airbag 25, at which the loop seam 26 is provided, is dented with respect to upper and lower end portions of the airbag 25. Therefore, the thorax and the abdomen of the occupant P on the front seat 21 is gently and reliably protected. On the other hand, the shoulder and the lumbar region of the occupant P are securely protected by the high inner pressure of the airbag 25.

The advantages of the above illustrated embodiment are as follows.

Since the slit formation portion 27 is provided on the fabric sheets 25a, 25b in areas encircled by the loop seam 26, the airbag 25 is deployed and inflated with the slit 27a being widened. When the slit 27a is opened, the thickness of the airbag 25 is increased to the thickness d2. Thus, the thickness d2, which is optimum for protecting the passenger P, is obtained. This improves the capacity for protecting the occupant P. The airbag 25 has a simple structure only with the loop seam 26 and the slit formation portion 27, and does not require any member for adjusting the thickness of the airbag 25 (for example, a tether). Therefore, the number of components is reduced, and no adjusting member needs to be sewn to the airbag 25. This reduces the material costs and the manufacturing costs. Therefore, the total costs of the side airbag apparatus 22 are reduced.

The slit formation portion 27 is formed along the longitudinal direction of the airbag 25, which has an elongated shape. Compared to a case where a slit formation portion is formed horizontally in the airbag 25 elongated along the up-and-down direction, the slit 27a, when opened, effectively increases the thickness of the airbag 25 in the entire airbag 25 along the up-and-down direction. Thus, the thickness d2, which is optimum for protecting the passenger P, is obtained in a large area. This improves the capacity for protecting the occupant P.

The loop seam 26 is located in the central portion of the airbag 25. Thus, the airbag 25 is deployed and inflated to have a donut-like shape with the central portion dented. Therefore, the thorax and the abdomen of the occupant P on the front seat 21 is gently and reliably protected. At this time, gas is reliably injected from the gas ports 24a, 24b of the inflator 24 to the upper and lower portions of the airbag 25, which optimizes the flow of gas in the airbag 25. Thus, the airbag 25 is deployed and inflated to have the thickness d2, which is effective to protect the occupant P, in a short time.

The slit formation portion 27 is formed along the longitudinal direction of the loop seam 26, which is substantially elliptical. Therefore, the slit 27a is opened wide when the airbag 25 is deployed and inflated, so that the thickness of the airbag 25 is increased to the thickness d2.

The slit formation portion 27 is formed by cutting the fabric sheets 25a, 25b. Thus, the slit formation portion 27 is easily formed. Accordingly, the manufacturing process is simplified. This further reduces the costs of the side airbag apparatus 22. Further, the size and the thickness of the airbag 25 when deployed and inflated are increased while limiting the area of the airbag 25 when the fabric sheets 25a, 25b are spread without gas filling the airbag 25. Therefore, the size of the airbag 25 when folded is reduced. This makes it easy to secure a space for accommodating the airbag 25. Also, the size of the side airbag apparatus 22 is also reduced.

The slit formation portion 27 is formed to be breakable with the cut sections 28 and the non-cut sections 29. Therefore, in the initial stage of deployment and inflation, the airbag 25 is deployed and inflated without breaking the slit formation portion 27 to open the slit 27a. This accelerates the deployment of the airbag 25. The thickness d1 of the deployed and inflated airbag 25 is less than that when the slit 27a is open. This permits the airbag 25 to be smoothly deployed and inflated even in a narrow space between the door 10 and the occupant P. Then, when the slit formation portion 27 is broken at the completion of deployment and inflation, the airbag 25 is inflated into a donut-like shape to widen the slit 27a. As a result, the airbag 25 has the thickness d2, which is optimal for protecting the occupant P. In this manner, even if the space between the side door 30 and the occupant P is narrow, the airbag 25 is reliably deployed and inflated while receiving little resistance. Further, when completely deployed and inflated, the airbag 25 has the thickness d2, which is optimal for protecting the occupant P.

The slit formation portion 27 includes three perforations 27b, and each perforation 27b includes alternately arranged cut sections 28 and the non-cut sections 29. Thus, when tension in the fore-and-aft direction acts on the airbag 25, the slit formation portion 27 is broken and the slit 27a is easily widened. Thus, the airbag 25 is deployed and inflated to have the thickness d2, which is effective to protect the occupant P, in a short time.

The present embodiment may be modified as described below.

The position of the loop seam 26 and the slit formation portion 27 is not limited to the central portion of the airbag 25, but may be a front end portion, rear end portion, an upper end portion, or a lower end portion.

The longitudinal size of the loop seam 26 may be shorter or longer than the range including the thorax and the abdomen of the occupant P. When the airbag 25 is viewed from a side of the vehicle, the loop seam 26 may be circular, square, rectangular, or diamond-shaped.

The number of the perforations 27b in the slit formation portion 27 in the loop seam 26 may be no more than two or no less than four.

Only one cut section 28 may be provided in the loop seam 26. In this case, the cut section 28 functions as a slit 27a without being changed. The airbag 25 is therefore deployed and inflated to the thickness d2 without a state of the thickness d1.

Two or more slit formation portions 27 may be formed in an area of the fabric sheets 25a, 25b that is encircled by the loop seam 26. The slit formation portions 27 may extend in different directions.

When the airbag 25 is viewed from a side, the slit formation portion 27 may be cross-shaped or L-shaped.

Figure 7:
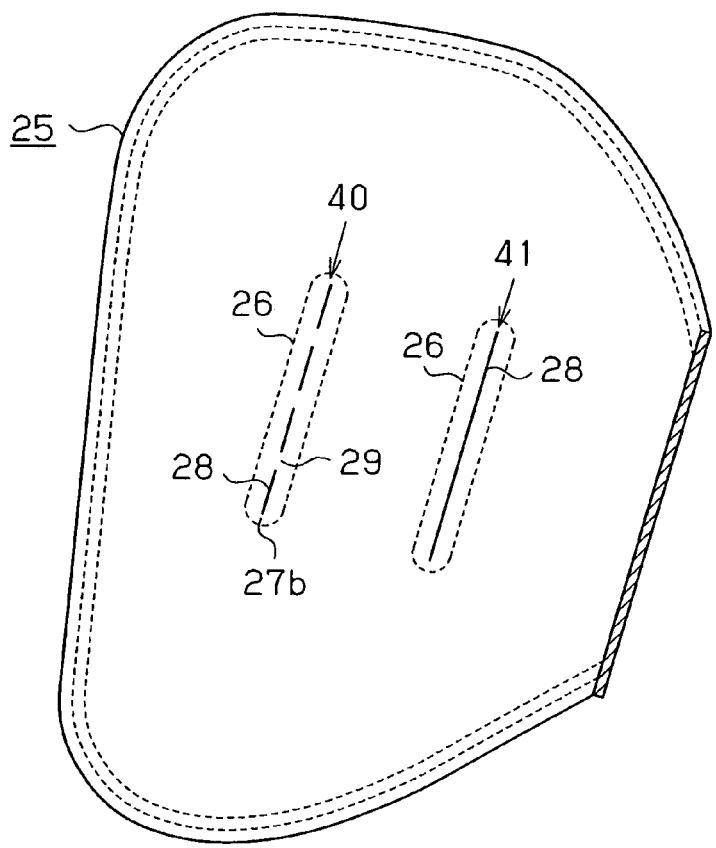
FIG. 7 is a plan view illustrating modifications of an airbag.
Figure 8:
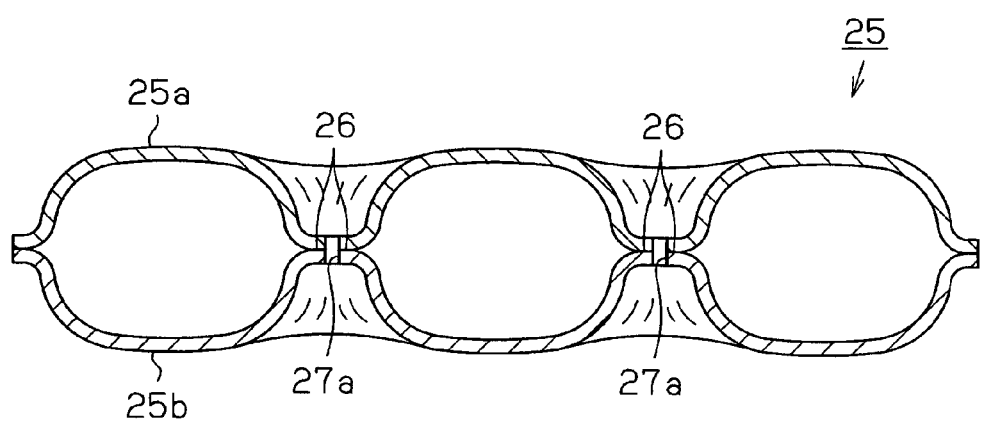
FIG. 8 is a cross-sectional view illustrating an airbag according to another modification when inflated and deployed, and after the slit formation portions are open.

Two loop seams 26 may be formed in the central portion of the airbag 25 as shown in FIGS. 7 and 8. The loop seams 26 may be arranged along the fore-and-aft direction as shown in FIG. 7 or the up-and-down direction. Compared to the case where only one loop seam 26 is formed in the airbag 25, the thickness d1 of the airbag 25 when deployed and inflated is small. In accordance with the type of the vehicle to which the side airbag apparatus 22 is installed, the number of the loop seams 26 may be changed.

In a modification shown in FIG. 7, two slit formation portions 40, 41 each encircled by a loop seam 26 are provided. The slit formation portion 40 is formed of a single perforation 27b including cut sections 28 and non-cut sections 29, and the slit formation portion 41 is formed of a single cut section 28 that linearly extends. In this manner, the slit formation portions 40, 41 in the loop seams 26 may be different from each other. Alternatively, the slit formation portions 40, 41 may have the same configuration.

FIG. 8 illustrates a deployed and inflated state of the airbag 25 shown in FIG. 7. In this case, a slit 27a is formed each seam 26.

The present examples and embodiments are to be considered as illustrative and not restrictive and the invention is not to be limited to the details given herein, but may be modified within the scope and equivalence of the appended claims.

The invention claimed is:

1. A side airbag apparatus for a vehicle, the apparatus having an airbag and a gas generator, wherein the gas generator supplies gas to the airbag such that the airbag is deployed and inflated at a side of an occupant, wherein the airbag has a loop seam, the loop seam being formed by sewing parts of the airbag that face each other in a lateral direction of the vehicle such that no clearance is created at the loop seam, wherein a slit formation portion is provided in part of the airbag that is encircled by the loop seam, and wherein, when the airbag is deployed and inflated, the slit formation portion opens as a slit.

2. The side airbag apparatus according to claim 1, wherein a measurement of the airbag along an up-and-down direction is greater than a measurement of the airbag along a fore-and-aft direction of the vehicle, and wherein the slit formation portion extends on the airbag along the up-and-down direction.

3. The side airbag apparatus according to claim 1, wherein, as viewed from a lateral direction of the vehicle, the loop seam is located in a center section of the airbag.

4. The side airbag apparatus according to claim 1, wherein the slit formation portion is formed of a perforation that extends like a broken line.

5. The side airbag apparatus according to claim 1, wherein the slit formation portion is formed of a cut section that extends linearly.

6. The side airbag apparatus according to claim 1, wherein the slit formation portion and the loop seam extend substantially in the same direction.

7. The side airbag apparatus according to claim 1, wherein the slit formation portion is formed of a plurality of perforations, the perforations being spaced by a predetermined interval and extending parallel to each other, wherein each perforation has a plurality of cut sections and a plurality of non-cut sections, the cut sections and non-cut sections being alternately arranged, and wherein each adjacent pair of the perforations are in a staggered arrangement so that the cut sections and non-cut sections in the adjacent perforations are arranged alternately.

8. The side airbag apparatus according to claim 1, wherein, when the airbag is deployed and inflated, the loop seam is arranged to correspond to a region from the thorax to the abdomen of the occupant.

9. The side airbag apparatus according to claim 1, wherein the loop seam is one of a plurality of loop seams.

10. The side airbag apparatus according to claim 9, wherein the loop seams are arranged such that each loop seam is located forward or rearward of another loop seam with respect to a fore-and-aft direction of the vehicle.

11. The side airbag apparatus according to claim 1, wherein, when deployed and inflated, the airbag is temporarily expanded to a predetermined first thickness along the lateral direction of the vehicle, and then, as the slit formation portion is broken to open, the airbag is expanded to a predetermined second thickness.

12. A side airbag apparatus for a vehicle, the apparatus having an airbag and a gas generator, wherein the gas generator supplies gas to the airbag such that the airbag is deployed and inflated at a side of an occupant, wherein the airbag has a loop seam, the loop seam being formed by joining parts of the airbag that face each other in a lateral direction of the vehicle such that no clearance is created at the loop seam, wherein a weakened portion is provided in part of the airbag that is encircled by the loop seam, and wherein the weakened portion is capable of being broken by tension generated by deployment and inflation of the airbag.

13. An airbag that is deployed and inflated at a side of an occupant of a vehicle with gas supplied by a gas generator, wherein the airbag has a loop seam, the loop seam being formed by sewing parts of the airbag that face each other in a lateral direction of the vehicle such that no clearance is created at the loop seam, wherein a slit formation portion is provided in part of the airbag that is encircled by the loop seam, and wherein, when the airbag is deployed and inflated, the slit formation portion opens as a slit.

14. The side airbag apparatus according to claim 1, wherein the slit formation portion is provided separately from the loop seam so as to be encircled by the loop seam, and wherein, when the airbag is deployed and inflated, the slit formation portion opens as the slit, the slit extending through the airbag without breaking the loop seam.

15. The airbag according to claim 13, wherein the slit formation portion is provided separately from the loop seam so as to be encircled by the loop seam, and wherein, when the airbag is deployed and inflated, the silt formation portion opens as the slit, the slit extending through the airbag without breaking the loop seam.

* * * * *